(12) United States Patent
Yamane (10) Patent No.: US 6,631,117 B1
(45) Date of Patent: Oct. 7, 2003

(54) OPERATIONS, MAINTENANCE, AND ADMINISTRATION PART CAPABLE OF TESTING INFORMATION NETWORK SYSTEM IN RESPONSE TO THE SAME COMMAND THAT GIVEN BEFORE RESTART OF RELIEVABLE LEVEL

(75) Inventor: Satoko Yamane, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/499,343

(22) Filed: Feb. 8, 2000

(30) Foreign Application Priority Data

Feb. 8, 1999 (JP) .......................................... 11-030679

(51) Int. Cl.[7] .............................................. H04L 12/26
(52) U.S. Cl. ................ 370/241; 370/241.1; 370/236.2; 714/718; 714/719
(58) Field of Search ............................. 370/236, 236.1, 370/236.2, 241, 241.1, 242, 244; 714/718, 719

(56) References Cited

FOREIGN PATENT DOCUMENTS

| JP | 3-22656 | | 1/1991 |
| JP | 03-022656 | * | 1/1991 |
| JP | 5-137170 | | 6/1993 |
| JP | 5-219201 | | 8/1993 |
| JP | 9-107401 | | 4/1997 |

* cited by examiner

*Primary Examiner*—Douglas Olms
*Assistant Examiner*—Robert W. Wilson
(74) *Attorney, Agent, or Firm*—Sughrue Mion, PLLC (57) ABSTRACT

In an operations, maintenance, and administration part, a starting data managing unit receives a command set and stores the command set into a memory. The starting data managing unit registers the command set stored in the memory to a first register when a test message processing section is in a not busy state. The starting data managing unit erases the command set from the memory both when the command set is registered in the first register and when restart of the part is made. The starting data managing unit deletes the command set from the first register when a notification is made by the test message processing section. A test information managing unit receives the command set and registers the command set to said second register together with state information of a registering state. The test information managing unit changes the state information from the registering state into a waiting state after it transmits a test message. The test information managing unit deletes the command set registered in the second register together with the state information of the registering state from the second register when the restart is made.

14 Claims, 7 Drawing Sheets

OPERATIONS, MAINTENANCE, AND ADMINISTRATION PART CAPABLE OF TESTING INFORMATION NETWORK SYSTEM IN RESPONSE TO THE SAME COMMAND THAT GIVEN BEFORE RESTART OF RELIEVABLE LEVEL

BACKGROUND OF THE INVENTION

This invention relates to an operations, maintenance, and administration part for an information network system that adopts a common channel signaling system, such as a signaling system No. 7.

To maintain an information network system which adopts a common channel signaling system and includes a plurality of exchanges (e.g. electronic switching systems) connected to one another, it is necessary to execute an OMAP test such as an MRVT (MTP (Message Transfer Part) Routing Verification Test) or an SRVT (SCCP (Signaling Connection Control Part) Routing Verification Test). The OMAP test is carried out according to an operation, maintenance, and administration protocol (OMAP) defined as Q.753 and Q.754 recommendations by ITU-T (International Telecommunication Union—Telecommunication Standardization Sector).

A conventional operations, maintenance, and administration part (hereinafter referred to simply as a maintenance part) is incorporated in each of the exchanges to execute the OMAP test. The maintenance part includes an input/output interface, a test starting and managing section, and a test message processing section.

The input/output interface is connected to an external maintenance terminal such as a workstation. The external maintenance terminal supplies the maintenance part with a command set representative of test information to make the maintenance part execute the OMAP test.

When the maintenance part receives the command set, the starting and managing section decides whether a starting data managing resource (i.e. a memory area) registering the same test information is already secured in a first register (or memory) or not. If the starting data managing resource is already secured in the first register, the starting and managing section informs the external maintenance terminal of an error through the input/output interface. On the other hand, if the starting data managing resource is not secured in the first register yet, the starting and managing section secures a new starting data managing resource in the first register and registers the test information in it. Then, the starting and managing section requests the test message processing section to transmit a test message.

When the test message processing section receives the request from the starting and managing section, it secures a test information managing resource (a memory area) in a second register and registers the test information read out from the new starting data managing resource. Then, the test message processing section establishes a connection with a destination exchange specified by the test information and transmits the test message to the destination exchange. In this time, the test message processing section starts up a timer for deciding a maximum waiting time. The exchange, which transmits the test message, is called a source exchange to distinguish from the destination exchange.

When the destination exchange receives the test message, it secures a test information managing resource and registers test information included in the test message therein. Then the destination exchange produces a response message on the basis of the test information registered in the test information resource and transmits the response message to the source exchange. Next, the destination exchange releases the test message processing resource thereof.

When the test message processing section of the source exchange receives the response message, it gives a notice of a result of the OMAP test to the test starting and managing section in response to the response message. Next, the test message processing section releases the test information managing resource thereof (or deletes the test information from the second register).

When the starting and managing section receives the notice of the result of the OMAP test, it transfers the notice to the external maintenance terminal through the input/output interface. Furthermore, the starting and managing section releases the staring data managing resource in this time. In other words, the starting and managing section deletes the test information from the first register.

The external maintenance terminal analyzes the notice of the result of the OMAP test and maintains the information network system on the basis of the analysis result.

If the test message processing section of the source exchange does not receive the response message before the timer clocks the maximum waiting time, it begins an audit trial.

If the external maintenance terminal supplies a plurality of command sets to the maintenance part, the maintenance part secures a plurality of starting data managing resources in the first register and a plurality of test information managing resources in the second register individually corresponding to the command information sets. The maintenance part also secures other test information managing resources in the second register when it receives test messages from the other exchanges.

In the following, consideration will be made about restart of the exchange.

The restart can be classified into two levels. One is a relievable level and the other is an unrelievable level. The restart of the unrelievable level means complete initialization and reactivation. The unrelievable level restart is carried out after a system down. On the other hand, the restart of the relievable level means initialization with keeping internal state of memories. The relievable level restart is carried out after temporary malfunction such as lack of memory areas. Hereinafter, the term of "restart" signifies the relievable level restart.

Now, it is assumed that the starting data managing resource is secured in the starting and managing section. In addition, it is assumed that the test information managing resource is secured in the test message processing section.

In this state, if the restart is made in the exchange, the test starting and managing section keeps the starting data managing resource and the test message processing section keeps the test information managing resource.

BY the way, there is a case where the OMAP test comes to an abnormal end when the restart is made in the middle of execution of the OMAP test. Accordingly, it is desired that the OMAP test is executed again when the restart is made in the exchange. However, the conventional maintenance part can not receive the same command set that represents the test information registered in the starting data managing resource.

If the OMAP test based on the test information registered in the starting data managing resource comes to a normal end, the starting data managing resource is released. It takes several seconds to execute the OMAP test. Accordingly, the command set which is not received by the conventional maintenance part immediately after the restart will be received in several seconds.

On the other hand, the conventional maintenance part executes an audit trial when the OMAP test comes to an abnormal end. It takes several hours to execute the audit trial. The starting data managing resource relating to the OMAP test is not released until the audit trial is finished. Thus the OMAP test can not be executed again for several hours in this case. This is a problem in the conventional maintenance part.

The conventional maintenance part further has another problem as follows.

There is a case that the test message processing section is in waiting state for receiving the response message after the restart even though it does not transmit the test message. In this case, the test message processing section never receives the response message. Moreover, the test message processing section never carries out a time out transaction because the timer is not started. Therefore, the OMAP test comes to the abnormal end. As mentioned above, the conventional maintenance part executes an audit trial when the OMAP test comes to the abnormal end. During the audit trial, the test information managing resource and the starting data managing resource are not released.

SUMMARY OF THE INVENTION

It is therefore an object of this invention to provide an operations, maintenance, and administration part which is capable of testing an information network system immediately after restart of a relievable level in response to the same command set that given before the restart.

It is another object of this invention to provide an operations, maintenance, and administration part which releases resources relating to an unprocessed OMAP test immediately after restart of an relievable level.

Other object of this invention will become clear as the description proceeds.

On describing the gist of this invention, it is possible to understand that operations, maintenance, and administration part is for maintaining an information network system. The part includes a test starting and managing section for receiving a command set and a test message processing section for transmitting a test message to the information network system in response to the command set.

According to the gist of this invention, the test starting and managing section comprises a memory for memorizing the command set. A first register registers the command set. A starting data managing unit is connected to the memory and the first register and manages the command set. The starting data managing unit carries out the steps of receiving the command set, storing the command set into the memory when the command set is received, registering the command set stored in the memory to a first register when the test message processing section is in a not busy state, erasing the command set from the memory both when the command set is registered in the first register and when restart of the part is made, and deleting the command set from the first register when a notification is made by the test message processing section.

In the operations, maintenance, and administration part, the test message processing section comprises a second register for registering the command set supplied from the test starting and managing section together with state information representative of either a registering state or a waiting state. A test message transmission/reception unit transmits the test message. A test information managing unit is connected to the second register and the test message transmission/reception unit and manages the command set. The test information managing unit carries out the steps of registering the command set supplied from the test starting and managing section in the second register, registering the state information of the registering state in the second register when the command set is registered in the second register, making the test message transmission/reception unit transmit the test message in response to the command set registered in the second register, changing the state information from the registering state into the waiting state after the message is transmitted, deleting the command set registered in the second register together with the state information of the registering state from the second register when the restart is made, and notifying the test starting and managing section of deleting the command set from the second register.

According to another gist of this invention, a method is for carrying out a test in an operations, maintenance, and administration part of an information network system. The part includes a test starting and managing section for receiving a command set and a test message processing section for transmitting a test message to said information network system in response to the command set. The method comprises the steps of receiving a command set at a starting data managing unit, storing, at the starting data managing unit, the command set into a memory when the command set is received, registering, at the starting data managing unit, the command set stored in the memory to a first register when the test message processing section is in a not busy state, erasing, at the starting data managing unit, the command set from the memory both when the command set is registered in the first register and when restart of the part is made, deleting, at the starting data managing unit, the command set from the first register when a notification is made by the test message processing section.

The method further comprises the steps of registering, at the test information managing unit, the command set supplied from the test starting and managing section in the second register, registering, at the test information managing unit, the state information of the registering state in the second register when the command set is registered in the second register, making the test message transmission/reception unit transmit the test message in response to the command set registered in the second register, changing, at the test information managing unit, the state information from the registering state into the waiting state after the message is transmitted, deleting the command set registered in the second register together with the state information of the registering state from the second register when the restart is made, and notifying the test starting and managing section of deleting the command set from the second register.

DESCRIPTION OF THE PREFERRED EMBODIMENTS

Figure 1:
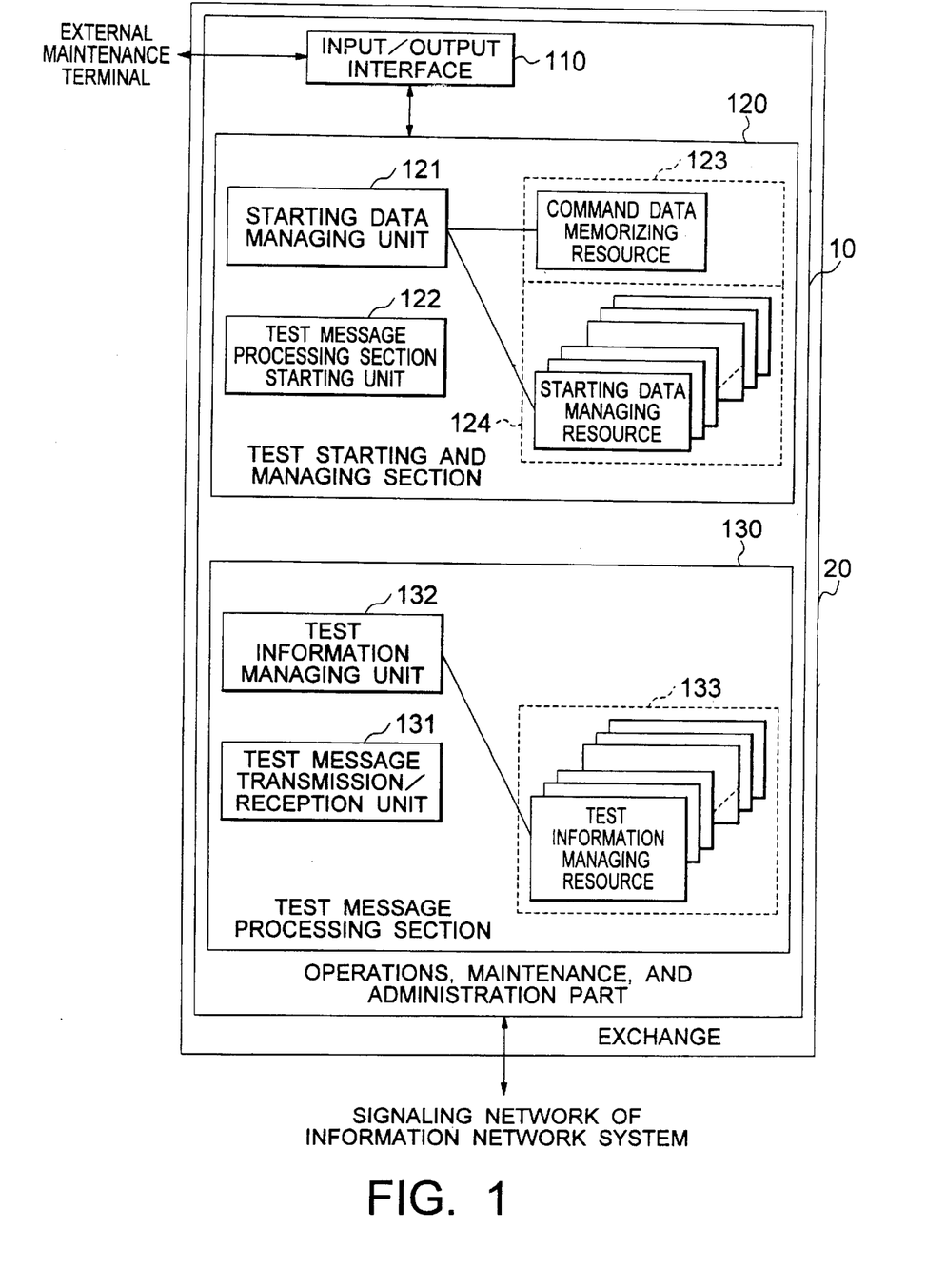
FIG. 1 is a block diagram of an operations, maintenance, and administration part according to a first embodiment of this invention.

Referring to FIG. 1, description will be made about an operations, maintenance, and administration part according to a first embodiment of this invention.

In FIG. 1, the operations, maintenance, and administration part 10 is incorporated in an exchange 20 of an information network system that adopts a common channel signaling system, such as a signaling system No. 7. The part 10 carries out an OMAP test in accordance with an operation, maintenance, and administration protocol (OMAP) defined as Q.753 and Q.754 recommendations by ITU-T (International Telecommunication Union—Telecommunication Standardization Sector).

The part 10 comprises an input/output interface 110, a test starting and managing section 120, and a test message processing section 130.

The input/output interface 110 is connected to an external maintenance terminal such as a workstation to receive a command set, which is representative of test information of the OMAP test and supplied from the external maintenance terminal, and to supply the external maintenance terminal with a test result. The input/output interface 110 supplies the command set to the test starting and managing section 120.

The test and managing section 120 has a starting data managing unit 121, a test message processing section starting unit 122, a temporary memory 123, and a first register 124.

The test message processing section 130 has a test message transmission/reception unit 131, a test information managing unit 132, and a second register 133.

The starting data managing unit 121 connected to the input/output interface 110 to receive the command set. Furthermore, the starting data managing unit 121 connected to the temporary memory 123, the first register 124, and the test message processing section starting unit 122.

When the starting data managing unit 121 receives the command set, it decides whether the same command set as the received command set is already registered in the first register 124 or not. In other words, the starting data managing unit 121 decides whether a starting data managing resource (or memory area) for registering the same command data is secured in the first register 124 or not when it receives the command data.

When the same command set is already registered in the first register 124, the starting data managing unit 121 informs the external maintenance terminal of an error through the input/output interface 110. On the other hand, when the same command set is not registered in the first register 124 yet, the starting data managing unit 121 decides whether the temporary memory 123 is in use or not. In other words, the starting data managing unit 121 decides whether a command data memorizing resource (or memory area) is secured in the temporary memory 123 or not when the same command set is not registered in the first register 124 yet.

When the temporary memory 123 is in use, the starting data managing unit 121 informs the external maintenance terminal of another error through the input/output interface 110. On the other hand, when the temporary memory 123 is out of use, the starting data managing unit 121 secures the command data memorizing resource in the temporary memory 123 and stores the received command set therein. Then the starting data managing unit 121 requests the test message processing section starting unit 122 to start up the test message processing section 130.

If the starting data managing unit 121 receives a start up acceptance response from the test message processing section starting unit 122, it secures a new starting data managing resource for the received command set in the first register 124 and registers the received command set therein. In this time, the starting data managing unit 121 further erases the command set from the temporary memory 123 to make the temporary memory 123 be out of use. Then the starting data managing unit 121 informs the external maintenance terminal of success in the starting of the OMAP test.

If the starting data managing unit 121 receives a start up refusal response from the test message processing section starting unit 122, it erases the command set from the temporary memory 123 and makes the temporary memory 123 be out of use without registering the received command set in the first register 124. In addition, the starting data managing unit 121 informs the external maintenance terminal of failure in the starting of the OMAP test.

When the starting data managing unit 121 receives a release demand, which demand to release the starting data managing resource, from the test message processing section starting unit 122, it releases the starting data managing resource.

If a relievable level restart is made in the exchange 20, the starting data managing unit 121 makes the temporary memory 123 be out of use.

The test message processing section starting unit 122 is connected to the test message transmission/reception unit 131 through a buffer memory (not shown), which is a system common resource for the exchange 20.

When the test message processing section starting unit 122 receives the request for starting up the test message processing section 130 from the starting data managing unit 121, it requests the test message transmission/reception unit 131 to transmit a test message. In this time, the test message processing section receives the command set memorized in the temporary memory 123 and transfers the command set to the test message transmission/reception unit 131.

If the test message processing section starting unit 122 receives a transmission acceptable response from the test message transmission/reception unit 131, it supplies the start up acceptable response to the starting data managing unit 121. On the other hand, if the test message processing section starting unit 122 receives a transmission refusal response from the test message transmission/reception unit 131, it supplies the start up refusal response to the starting data managing unit 121.

When the test message processing section starting unit 122 receives a notification that is representative of cancellation of the OMAP test from the test message transmission/reception unit 131, it supplies the release demand to the starting data managing unit 121. The test message processing section starting unit 122 also supplies the release demand to the starting data managing unit 121 when it receives the result of the OMAP test.

The test message transmission/reception unit 131 is connected to the test information managing unit 132.

When the test message transmission/reception unit 131 receives the request for transmitting the test message from the test message processing section starting unit 122, it decides whether it can accept the request or not. If the test message transmission/reception unit 131 is not busy, it decides to accept the request and supplies the transmission acceptable response to the test message processing section starting unit 122. At the same time, the test message transmission/reception unit 131 requests the test information managing unit 132 to register the command set. On the other hand, if the test message transmission/reception unit 131 is busy, it decides to refuse the request and supplies the transmission refusal response to the test message processing section starting unit 122.

After the test message transmission/reception unit 131 supplies the transmission acceptable response, it decides a destination exchange in the information network system in response to the command set. The test message transmission/reception unit 131 produces the test message and transmits it to the destination exchange. Then, the test message transmission/resection unit 131 gives notice of the transmission to the test information managing unit 132. The test message transmission/reception unit 131 further receives a response message supplied from the destination exchange.

When the test message transmission/reception unit 131 receives the response message from the destination exchange, it notifies the test information managing unit 132 of reception of the response message. At the same time, the test message transmission/reception unit 131 supplies a result of the OMAP test to the test message processing section starting unit 122 in response to the response message.

There is a case where the test message transmission/reception unit 131 decides a plurality of destination exchanges in response to the command set. In this case, the test message transmission/reception unit 131 transmits the test message to each of the destination exchanges. Then the test message transmission/reception unit 131 notifies the test information managing unit of reception of the response messages when it receives the response messages form all of the destination exchanges.

When the test message transmission/reception unit 131 receives a releasing notice from the test information managing unit 132, it secures an area in the buffer memory to give the notification of the cancellation of the OMAP test to the test message processing section starting unit 122.

The test information managing unit 132 is connected to the second register 133. When the test information managing unit 132 receives the request of registering the command set from the test message transmission/reception unit 131, it secures a new test information managing resource in the second register 133 to register the command set therein. Then the test information managing unit 132 registers the command set at the newly secured test information managing resource together with state information representative of a registering state. Then the test information managing unit 132 informs the test message transmission/reception unit 131 of the registering finish.

When the test information managing unit 132 receives the notice of the transmission from the test message transmission/reception unit 131, it changes the state information registered at the test information managing resource from the registering state to a waiting state.

The test information managing unit 132 deletes the command set and releases the test information managing resource when it receives the notice of the reception of the response message.

If the relievable level restart is made in the exchange 20, the test information managing unit 132 selectively deletes the command set registered in the second register 133 together with the state information of the registering state to release the test information managing resource. That is, the test information managing unit does not delete the command set registered in the second register 133 together with the state information of the waiting state when the relievable level restart is made in the exchange 20. When the test information managing unit 132 releases the test information managing resource, it supplies the releasing notice to the test message transmission/reception unit 131.

A normal operation of the part 10 will be made soon.

At first, the external maintenance terminal supplies the command set to the input/output interface 110. The input/output interface 110 transfers the command set to the starting data managing unit 121.

When the starting data managing unit 121 receives the command set, it decides whether the same command set as the received command set is already registered in the first register 124 or not. If the same command set is already registered in the first register 124, the starting data managing unit 121 informs the input/output interface 110 of the error.

When the same command set is not registered in the first register 124 yet, the starting data managing unit 121 decides whether the temporary memory 123 is in use or not. If the temporary memory 123 is in use, the starting data managing unit 121 informs the input/output interface 110 of the error.

When the temporary memory 123 is out of use, the starting data managing unit 121 stores the command set in the temporary memory 123.

Next, the test message processing section starting unit 122 requests the test message transmission/reception unit 131 to transmit the test message.

When the test message transmission/reception unit 131 receives the request for transmitting the test message from the test message processing section starting unit 122, it decides whether it can accept the request or not. The test message transmission/reception unit 131 supplies the transmission acceptable response to the test message processing section starting unit 122 when it accepts the request. The test message transmission/reception unit 131 supplies the transmission refusal response to the test message processing section starting unit 122 when it does not accept the request.

When the test message processing section starting unit 122 receives the transmission acceptable response, it supplies the start up acceptable response to the starting data managing unit 121. When the test message processing section starting unit 122 receives the transmission refusal response, it supplies the start up refusal response to the starting data managing unit 121.

If the starting data managing unit 121 receives the start up acceptance response, it secures the new starting data managing resource and copies the command set stored in the temporary memory 123 into the newly secured starting data managing resource. In this time, the starting data managing unit 121 further makes the temporary memory 123 be out of use. In addition, the starting data managing unit 121 informs the input/output interface 110 of the success in the starting of the OMAP test.

When the starting data managing unit 121 receives the start up refusal response, it makes the temporary memory 123 be out of use and informs the input/output interface 110 of the failure in the starting of the OMAP test.

After the test message transmission/reception unit 131 decides to accept the request, it requests the test information managing unit 132 to register the command set.

If the test information managing unit 132 receives the request of registering the command set, it secures the new test information managing resource in the second register 133 to register the command set therein. When the test information managing unit 132 registers the command set at the newly secured test information managing resource, the state information of the registering state is registered together with. Then the test information managing unit 132 notifies the test message transmission/reception unit 131 of registering finish.

When the test message transmission/reception unit 131 receives a notice of the registering finish, it decides the destination exchange and transmits the test message to the destination exchange. Then, the test message transmission/resection unit 131 gives the notice of the transmission to the test information managing unit 132.

When the test information managing unit 132 receives the notice of the transmission of the test message, it changes the state information of the stating data managing resource from the registering state to the waiting state.

If the test message transmission/reception unit 131 can not transmit the test message, it notifies the test information managing unit 132 and the test message processing section starting unit 122 of transmission error.

When the test information managing unit 132 receives the notice of the transmission error, it releases the test information managing resource.

When the test message transmission/reception unit 131 receives the response message relating to the test message from the destination exchange, it supplies the result of the OMAP test to the test message processing section starting unit 122 in response to the response message and notifies the test information managing unit 132 of the reception of the response message.

When the test information managing unit 132 receives the notice of the reception of the response message, it releases the test information managing resource relating to the response message.

When the test message processing section starting unit 122 receives the result of the OMAP test, it transfer the result to the input/output interface 110 and supplies the release demand to the starting data managing unit 121.

When the starting data managing unit 121 receives the release demand, it releases the starting data managing resource.

When the input/output interface 110 receives the result of the OMAP test, it transfers the result to the external maintenance terminal.

Figure 2:
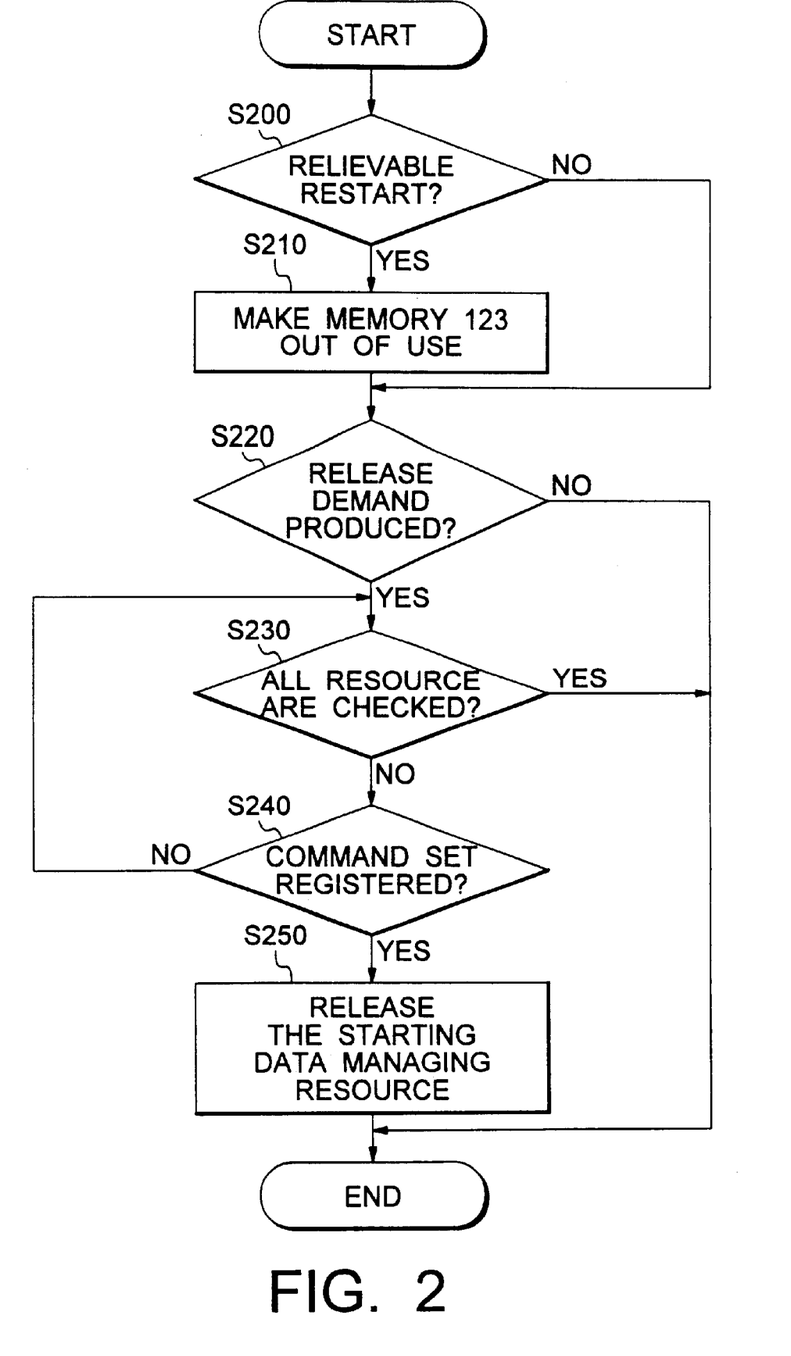
FIG. 2 is a flowchart for describing an operation of the test starting and managing section 120.
Figure 3:
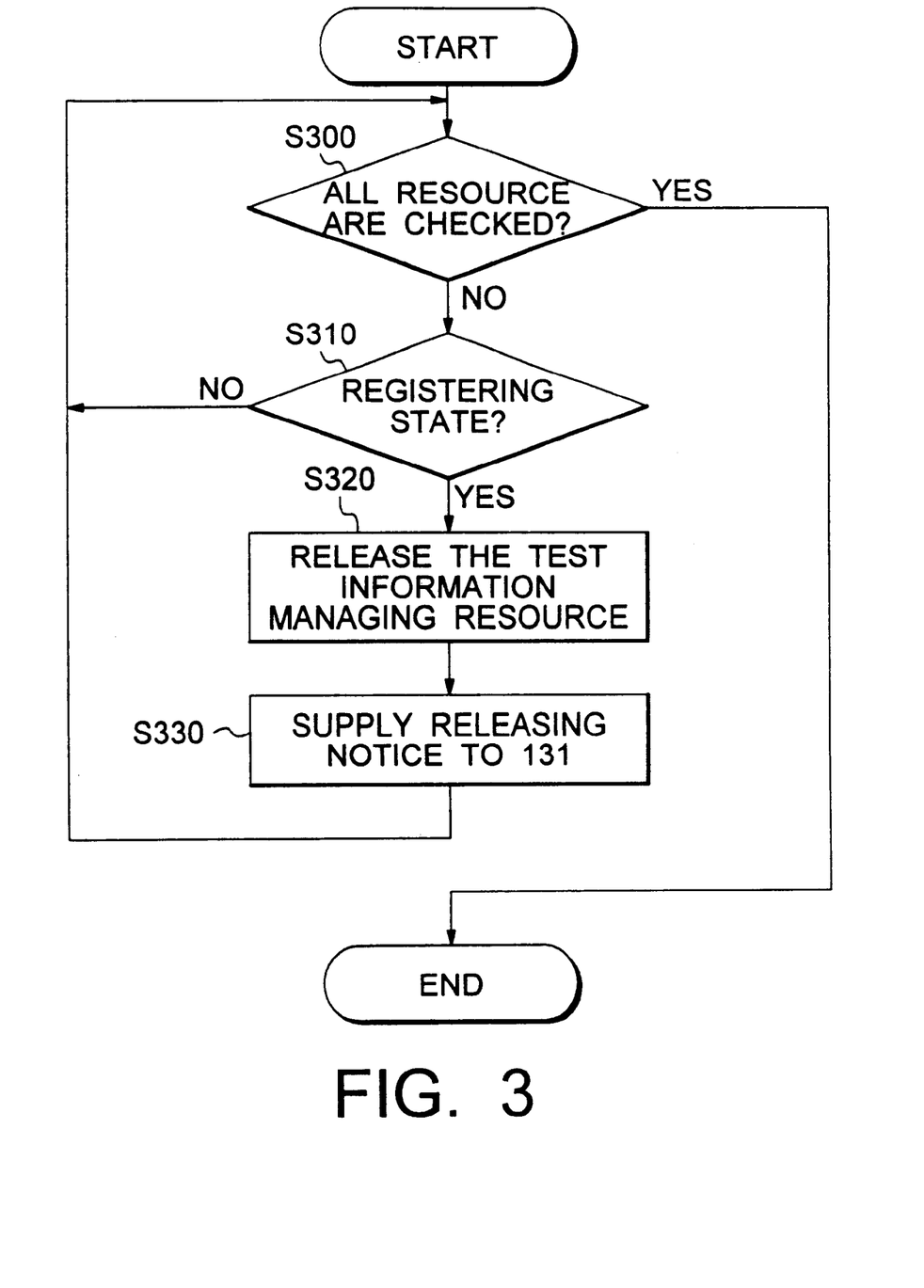
FIG. 3 is a flowchart for describing an operation of the test message processing section 130.
Figure 4:
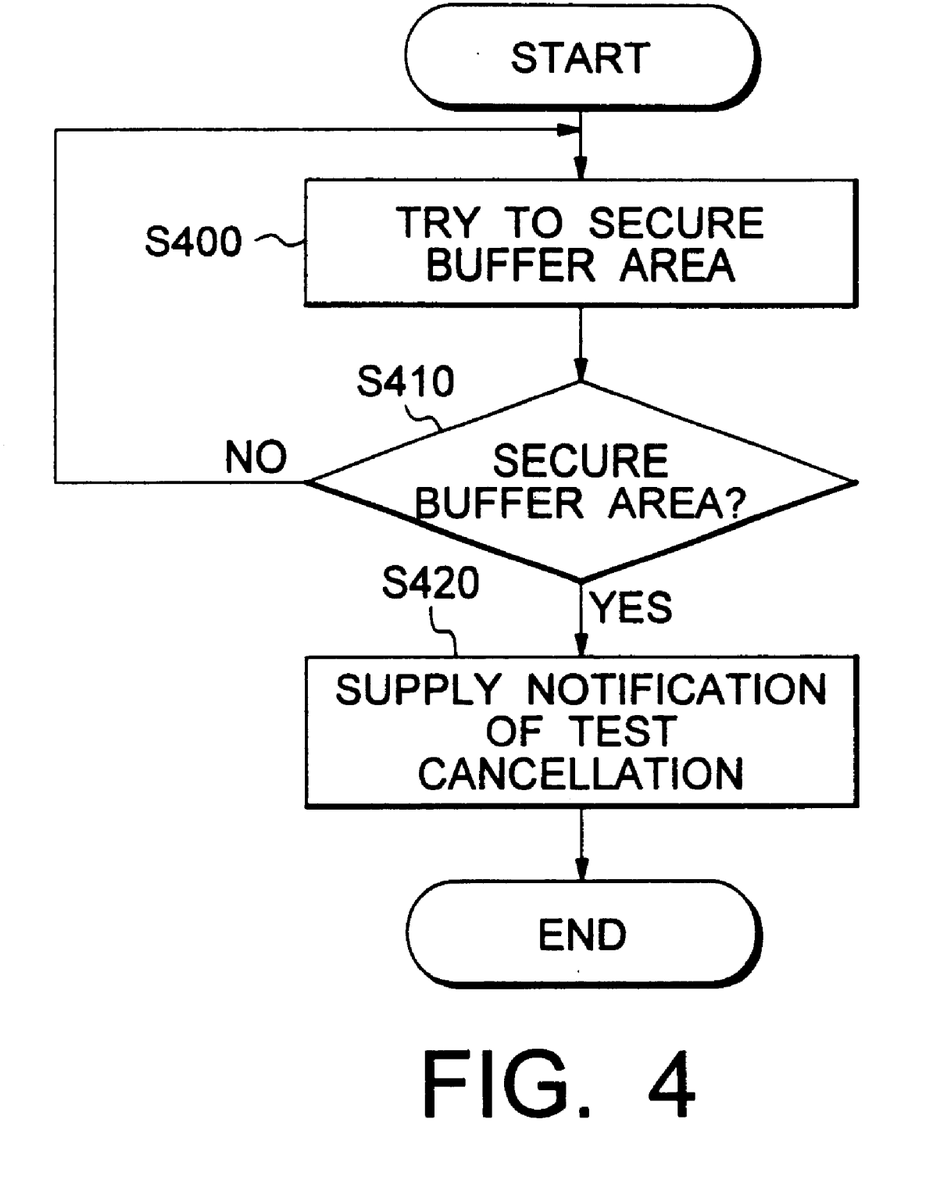
FIG. 4 is a flowchart for describing an operation of the test message transmission/reception unit 131.

Referring to FIGS. 2 to 4, the description is will be made about an operation of the part 10 when the relievable level restart is made in the exchange.

FIGS. 2, 3, and 4 show flowcharts representative of operations of the test starting and managing section 120, the test message processing section 130, and the test message transmission/reception unit 131, respectively.

In FIG. 2, it is assumed that a plurality of starting data managing resources is secured in the first register 124. The starting data managing resources relates to a plurality of OMAP tests, which is different from one another, respectively.

The test starting and managing section 120 decides whether the restart is the relievable level or the unrelievable level at the step S200. If the restart is the relievable level, the step S200 goes to the step S210. On the other hand, if the restart is the unrelievable level, the step S200 goes to the step S220.

The test starting and managing section 120 makes the temporary memory 123 be out of use at the step S210.

At the step S220, the test starting and managing section 120 decides whether the test message processing section starting unit 122 supplies the release demand to the starting data managing unit 121 or not. If the test message processing section starting unit 122 supplies the release demand to the starting data managing unit 121, the step S220 goes to the step S230. When the test message processing section starting unit 122 does not supply the release demand to the starting data managing unit 121, the step S220 jumps to the end.

At the step S230, the test starting and managing section 120 decides whether all of the starting data managing resources are checked or not. If all of the starting data managing resources are checked, the step S230 goes to the end. When all of the starting data managing resources are checked, the step S230 goes to the step S240.

At the step S240, the test starting and managing section 120 checks the command set registered at each of the starting data managing resources against the command set relating to the release demand. If the command set relating to the release demand is registered at any of the starting data managing resources, the starting data managing resource that the command set relating to the release demand registered in is released at the step S250.

In FIG. 3, it is assumed that a plurality of test information managing resources is secured in the second register 124. The test information managing resources relates to a plurality of OMAP tests, which is different from one another, respectively.

The test message processing section 130 decides whether all of the test information managing resources are checked or not at the step S300. If all of the test information managing resources are checked, the step S300 goes to the end. When all of the test information managing resources are not checked, the step S300 goes to the step S310.

At the step S310, the test message processing section 130 checks whether the state information registered at each test message information managing resource is the registering state or the waiting state. If each of the test information managing resources registers the registering state, the step S310 goes to the step S320. When each of the test information managing resources registers the waiting state, the step S310 returns to the step S300.

The test message processing section 130 releases the test information managing resource registering the registering state at the step S320.

In the test message processing section 130, the test information managing unit 132 supplies the releasing notice to the test message transmission/reception unit 131 at the step S330.

When the test message transmission/reception unit 131 receives the releasing notice from the test information managing unit 132, operates as shown in FIG. 4.

Namely, the test message transmission/reception unit 131 tries to secures a buffer area for the notification of the cancellation of the OMAP test in the buffer memory at the step S400. This trial for securing buffer area is repeated until the buffer area is secured in the buffer memory (the step S410).

If the test message transmission/reception unit 131 secures the buffer area in the buffer memory, it supplies the notification of the cancellation of the OMAP test to the test message processing section starting unit 122 at the step S420.

Thereafter, the test message processing section starting unit 122 supplies the release demand to the starting data managing unit 121.

Thus, the part 10 can receive the same command set that is given before the relievable restart and can execute an OMAP test in response to the same command set.

In addition, the part 10 releases the test information managing resource and the starting data managing resource relating to the OMAP test that the test message does not transmit immediately after the relievable restart.

Figure 5:
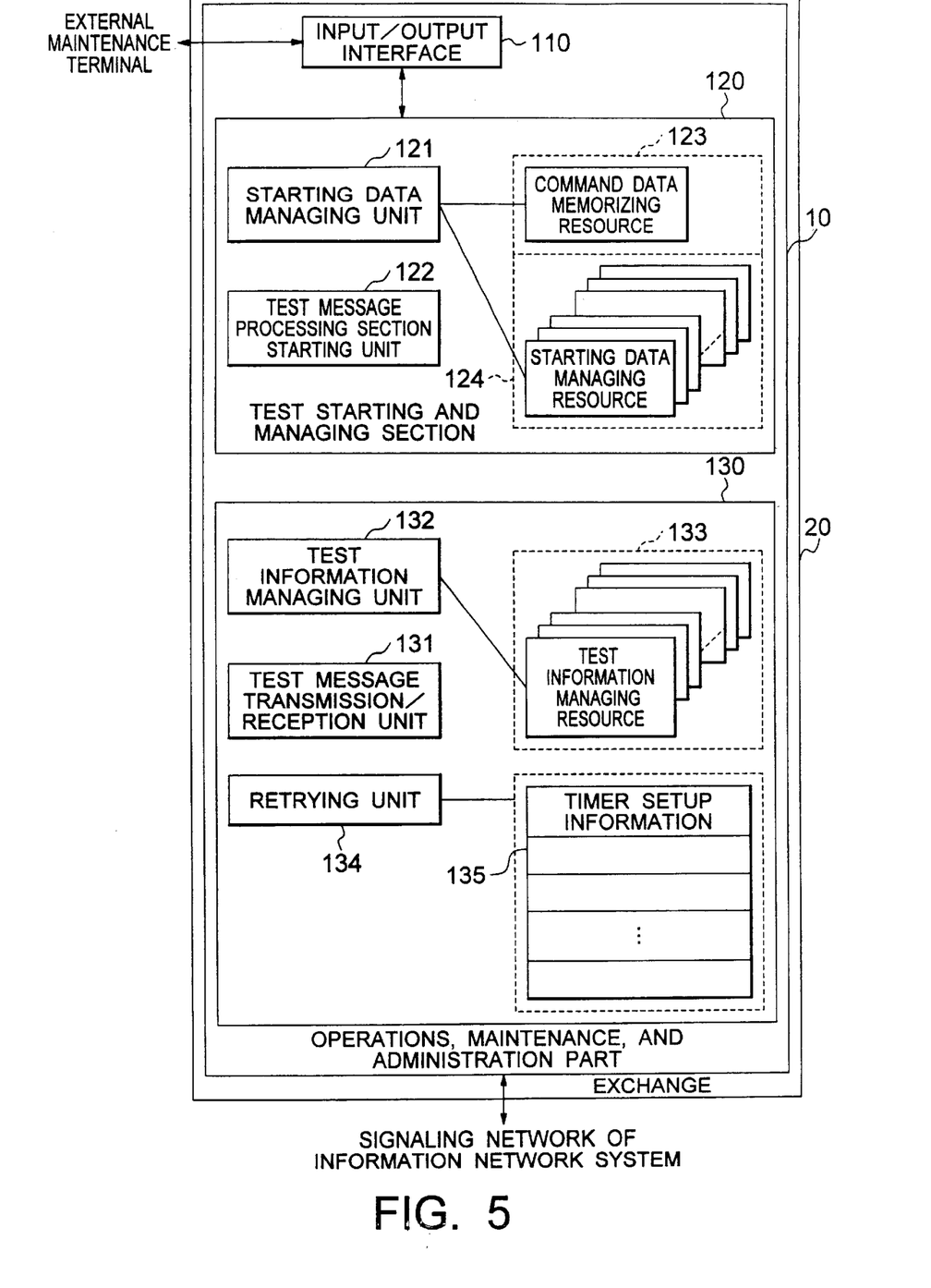
FIG. 5 is a block diagram of an operations, maintenance, and administration part according to a second embodiment of this invention.

Referring to FIG. 5, the description will proceed to an operations, maintenance, and administration part according to a second embodiment of this invention.

In FIG. 5, the part 10 has a retrying unit 134 and a timer managing table 135 in the test message processing section 130. The timer managing tables 135 is provided in a memory (not shown).

The retrying unit 134 supplies the notification of the cancellation of the OMAP test to the test message processing section starting unit 122 in place of the test message transmission/reception unit 131 when the buffer area can not be secured in the buffer memory once. The retrying unit 134 stores timer set up information in the timer managing table 135 to repeat securing of the buffer area until the buffer area is secured in the buffer memory and to supply the notification to the test message processing section starting unit 122. The retrying unit 134 repeats securing of the buffer area according to the timer managing table 135 until the buffer area is secured in the buffer memory. When the retrying unit 134 secures the buffer area, it supplies the notification to the test message processing section starting unit 122.

Figure 6:
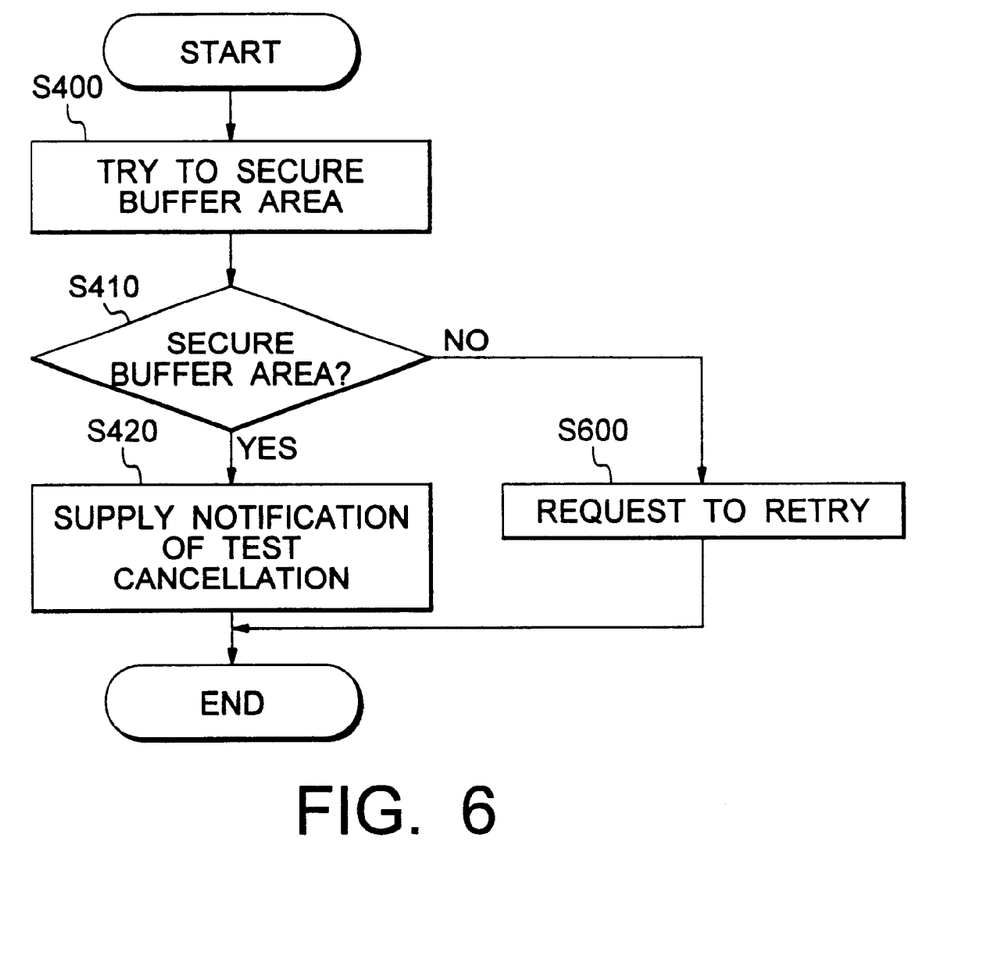
FIG. 6 is a flowchart for describing an operation of the test message processing section 130.
Figure 7:
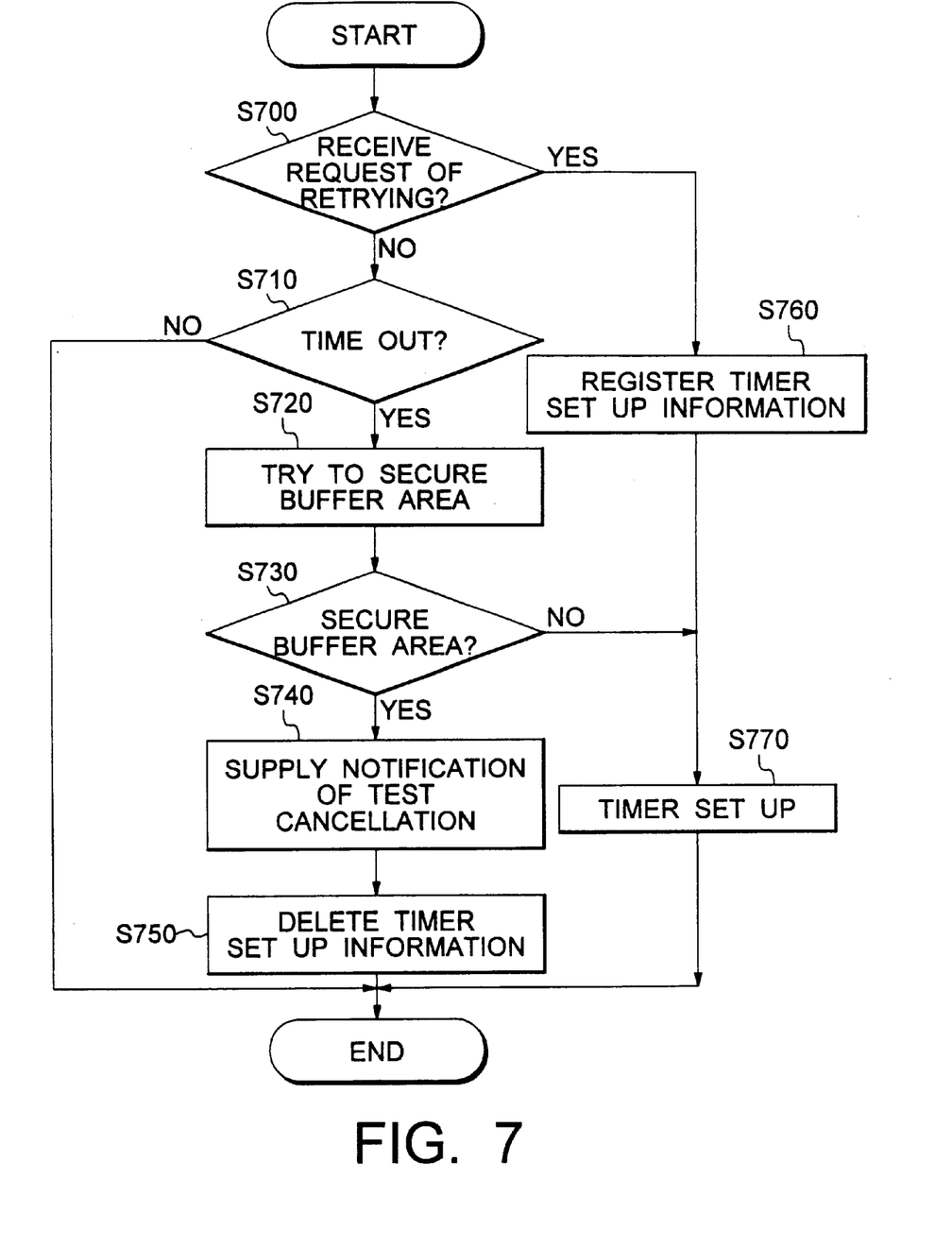
FIG. 7 is a flowchart for describing an operation of the retrying unit 134.

Referring to FIGS. 6 and 7, the description is will be made about an operation of the part 10 after the test message transmission/reception unit 131 receives the releasing notice from the test information managing unit 132.

FIGS. 6 and 7 show flowcharts representative of operations of the test message transmission/reception unit 131 and the retrying unit 134, respectively.

As shown in FIG. 6, the test message transmission/reception unit 131 requests the retrying unit 134 to retry to supply the notification at the step S600 when the test message transmission/reception unit 131 can not secures the buffer area in the buffer memory at the step S420.

The retrying unit 134 operates as shown in FIG. 7 at regular time intervals.

At the step S700, the retrying unit 134 decides whether the retrying unit 134 receives the request of the retrying from the test message transmission/reception unit 131 or not. If the retrying unit 134 receives the request, the step S700 goes to the step S760. When the retrying unit 134 does not receives the request, the step S700 goes to the step S710.

At the step S760, the retrying unit 134 registers the timer set up information in the timer managing table 135. Then the retrying unit 134 set up a timer at the step S770. The timer is for deciding a maximum waiting time for the response message.

After the step S760, the retrying unit 134 sleeps until the predetermined time elapses.

At the step S710, the retrying unit 134 decides whether the time defined by the time set up information elapses or not. That is, the retrying unit 134 decides whether the time becomes time out or not. IF the time defined by the time set up information elapses, the step S710 goes to the step S720. When the time does not elapses, the step S710 jumps to the end.

At the step S720, the retrying unit 134 tries to secure the buffer area in the buffer memory. Then the retrying unit 134 decides whether it secures the buffer area or not at the step S730. If the retrying unit 134 secures the buffer area, the retrying unit 134 supplies the notification to the to the test message processing section starting unit 122 at the step S740. When the retrying unit 134 can not secure the buffer area, the step S740 goes to the step S770.

After the step S740, the retrying unit 134 deletes the timer set up information from the timer managing table 135 and sleeps.

According to this embodiment, the test message transmission/reception unit 131 is not devoted to secure the buffer memory and the retrying unit 134 operates at the regular time intervals. Therefore, there is nothing that loads are concentrated on the test message transmission/reception unit 131.

While this invention has thus for been described in conjunction with the preferred embodiment thereof, it will readily be possible for those skilled in the art to put this invention into practice in various other manners. For example, the temporary memory 123 and the first register 124 may be a single device. Similarly, the second register 133 and the memory for the timer set up information may be a single device.

What is claimed is:

1. An operations, maintenance, and administration part for maintaining an information network system, said part including a test starting and managing section for receiving a command set and a test message processing section for transmitting a test message to said information network system in response to the command set, wherein said test starting and managing section comprises:
   a memory for memorizing the command set,
   a first register for registering the command set, and
   a starting data managing unit connected to said memory and said first register for managing the command set, wherein:
     said starting data managing unit carries out the steps of:
       receiving the command set,
       storing the command set into said memory when the command set is received,
       registering the command set stored in said memory to said first register when said test message processing section is in a not busy state,
       erasing the command set from said memory both when the command set is registered in said first register and when restart of said part is made, and
       deleting the command set from said first register when a notification is made by said test message processing section.

2. An operations, maintenance, and administration part as claimed in claim 1, wherein said starting data managing unit further carries out the steps of:
   deciding whether the command set is already registered in said first register or not before the storing step, and
   starting the storing step when the command set is not registered in said first register yet.

3. An operations, maintenance, and administration part as claimed in claim 1, wherein said starting data managing unit further carries out the step of inquiring of said test message processing section whether said test message processing section is in the not busy state or not.

4. An operations, maintenance, and administration part as claimed in claim 1, wherein said part operates in accordance with an operation, maintenance, and administration protocol defined as Q.753 and Q.754 recommendations by ITU-T.

5. An operations, maintenance, and administration part as claimed in claim 1, wherein said test message processing section comprises:
- a second register for registering the command set supplied from said test starting and managing section together with state information representative of either a registering state or a waiting state,
- a test message transmission/reception unit for transmitting the test message, and
- a test information managing unit connected to said second register and said test message transmission/reception unit for managing the command set, wherein:
- said test information managing unit carries out the steps of:
  - registering the command set supplied from said test starting and managing section in said second register,
  - registering the state information of the registering state in said second register when the command set is registered in said second register,
  - making said test message transmission/reception unit transmit the test message in response to the command set registered in said second register,
  - changing the state information from the registering state into the waiting state after the message is transmitted,
  - deleting the command set registered in said second register together with the state information of the registering state from said second register when the restart is made, and
  - notifying said test starting and managing section of deleting the command set from said second register.

6. An operations, maintenance, and administration part as claimed in claim 5, wherein said test message processing section further comprises a retry unit for retrying the notifying step at predetermined time interval until the notification is finished.

7. An operations, maintenance, and administration part as claimed in claim 5, wherein said part operates in accordance with an operation, maintenance, and administration protocol defined as Q.753 and Q.754 recommendations by ITU-T.

8. A method for carrying out a test in an operations, maintenance, and administration part of an information network system, said part including a test starting and managing section for receiving a command set and a test message processing section for transmitting a test message to said information network system in response to the command set, comprising the steps of:
- receiving a command set at a starting data managing unit,
- storing, at said starting data managing unit, the command set into a memory when the command set is received,
- registering, at said starting data managing unit, the command set stored in said memory to a first register when said test message processing section is in a not busy state,
- erasing, at said starting data managing unit, the command set from said memory both when the command set is registered in said first register and when restart of said part is made,
- deleting, at said starting data managing unit, the command set from said first register when a notification is made by said test message processing section.

9. A method as claimed in claim 8, wherein said method further comprises the steps of:
- deciding, at said starting data managing unit, whether the command set is already registering in said first register or not before the storing step, and
- starting the storing step when the command set is not registering in said first register yet.

10. A method as claimed in claim 8, wherein said method further comprises the step of inquiring of said test message processing section whether said test message processing section is in the not busy state or not.

11. A method as claimed in claim 8, wherein said method is carried out in accordance with an operation, maintenance, and administration protocol defined as Q.753 and Q.754 recommendations by ITU-T.

12. A method as claimed in claim 8, wherein said method further comprises the steps of:
- registering, at said test information managing unit, the command set supplied from said test starting and managing section in said second register,
- registering, at said test information managing unit, the state information of the registering state in said second register when the command set is registered in said second register,
- making said test message transmission/reception unit transmit the test message in response to the command set registered in said second register,
- changing, at said test information managing unit, the state information from the registering state into the waiting state after the message is transmitted,
- deleting the command set registered in said second register together with the state information of the registering state from said second register when the restart is made, and
- notifying said test starting and managing section of deleting the command set from said second register.

13. A method claimed in claim 8, wherein said method further comprises the step of retrying the notifying step at predetermined time interval until the notification is finished.

14. A method claimed in claim 8, wherein said method is carried out in accordance with an operation, maintenance, and administration protocol defined as Q.753 and Q.754 recommendations by ITU-T.

* * * * *